(12) United States Patent
Inai et al.

(10) Patent No.: US 11,990,775 B2
(45) Date of Patent: May 21, 2024

(54) ELECTRONIC APPARATUS AND CONTROL METHOD

(71) Applicant: CANON KABUSHIKI KAISHA, Tokyo (JP)

(72) Inventors: Kento Inai, Kanagawa (JP); Hiroshi Moritomo, Tokyo (JP); Sho Ichikawa, Kanagawa (JP); Kenichirou Hayashi, Aichi (JP); Shigeo Aoyagi, Kanagawa (JP); Sayaka Kumon, Tokyo (JP); Hirokazu Izuoka, Kanagawa (JP); Akira Matsuo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 356 days.

(21) Appl. No.: 17/236,940

(22) Filed: Apr. 21, 2021

(65) Prior Publication Data
US 2021/0336459 A1 Oct. 28, 2021

(30) Foreign Application Priority Data
Apr. 28, 2020 (JP) ................................. 2020-079376

(51) Int. Cl.
*G06F 21/44* (2013.01)
*G05B 15/02* (2006.01)
(Continued)

(52) U.S. Cl.
CPC .......... *H02J 7/00045* (2020.01); *G05B 15/02* (2013.01); *G06F 21/44* (2013.01);
(Continued)

(58) Field of Classification Search
CPC .. H02J 7/00045; H02J 7/0063; H02J 7/00036; G06F 21/44; G06F 21/445;
(Continued)

(56) References Cited

U.S. PATENT DOCUMENTS

| 7,259,539 B2 * | 8/2007 | Suzuki | ................ H02J 7/00047 |
| | | | 320/110 |
| 2014/0226673 A1 * | 8/2014 | Hirashima | ........ H04L 12/40006 |
| | | | 370/401 |

(Continued)

FOREIGN PATENT DOCUMENTS

| JP | 2007282471 A | 10/2007 |
| JP | 2016054615 A | 4/2016 |
| JP | 2019129475 A | 8/2019 |

*Primary Examiner* — Shaqueal D Wade-Wright
(74) *Attorney, Agent, or Firm* — CANON U.S.A., INC. IP Division

(57) ABSTRACT

An apparatus includes a first authentication unit that performs an authentication process for determining whether an external apparatus is a predetermined external apparatus, a second authentication unit that performs an authentication process for determining whether a battery connected to the external apparatus is a predetermined battery, and a control unit that permits the battery to be discharged but restricts the battery from being charged regardless of whether the battery is the predetermined battery, in a case where the external apparatus is not authenticated as the predetermined external apparatus.

14 Claims, 7 Drawing Sheets

(51) Int. Cl.
*H02J 7/00* (2006.01)
*G06F 21/70* (2013.01)
*G06F 21/75* (2013.01)
*H04L 67/12* (2022.01)

(52) U.S. Cl.
CPC .......... *G06F 21/445* (2013.01); *H02J 7/0063* (2013.01); *G06F 21/70* (2013.01); *G06F 21/75* (2013.01); *H04L 67/12* (2013.01)

(58) Field of Classification Search
CPC ......... G06F 21/70; G06F 21/75; H04L 67/12; H01M 10/44; G05B 15/02
See application file for complete search history.

(56) References Cited

U.S. PATENT DOCUMENTS

| | | | |
|---|---|---|---|
| 2017/0053501 A1* | 2/2017 | Kamiwano | G08B 5/225 |
| 2017/0126029 A1* | 5/2017 | Moritomo | H02J 7/0071 |
| 2019/0033937 A1* | 1/2019 | Inoue | H02J 7/00038 |

* cited by examiner

ELECTRONIC APPARATUS AND CONTROL METHOD

BACKGROUND

Field of the Disclosure

Aspects of the disclosure generally relate to an electronic apparatus capable of determining whether an accessory apparatus is a predetermined accessory apparatus, and a control method thereof.

Description of the Related Art

Japanese Patent Application Laid-Open No. 2007-282471 discusses an electronic apparatus that authenticates batteries.

However, in Japanese Patent Application Laid-Open No. 2007-282471, the electronic apparatus cannot perform an authentication of an accessory apparatus (for example, a battery grip) connected to the electronic apparatus although being able to perform an authentication of the battery connected to the electronic apparatus. Furthermore, the electronic apparatus cannot perform an authentication of an apparatus connected to the accessory apparatus, either.

SUMMARY

According to an aspect of the embodiments, there is provided an apparatus that includes a first authentication unit that performs an authentication process for determining whether an external apparatus is a predetermined external apparatus, a second authentication unit that performs an authentication process for determining whether a battery connected to the external apparatus is a predetermined battery, and a control unit that permits the battery to be discharged but restricts the battery from being charged regardless of whether the battery is the predetermined battery, in a case where the external apparatus is not authenticated as the predetermined external apparatus.

According to another aspect of the embodiments, there is provided a method that includes performing an authentication process for determining whether an external apparatus is a predetermined external apparatus, performing an authentication process for determining whether a battery connected to the external apparatus is a predetermined battery, and permitting the battery to be discharged but restricting the battery from being charged regardless of whether the battery is the predetermined battery, in a case where the external apparatus is not authenticated as the predetermined external apparatus.

Further aspects of the embodiments will become apparent from the following description of exemplary embodiments.

DESCRIPTION OF THE EMBODIMENTS

Exemplary embodiments, features, and aspects of the disclosure will be described below with reference to the drawings. However, aspects of the disclosure are not limited to the following embodiments.

Figure 1A:
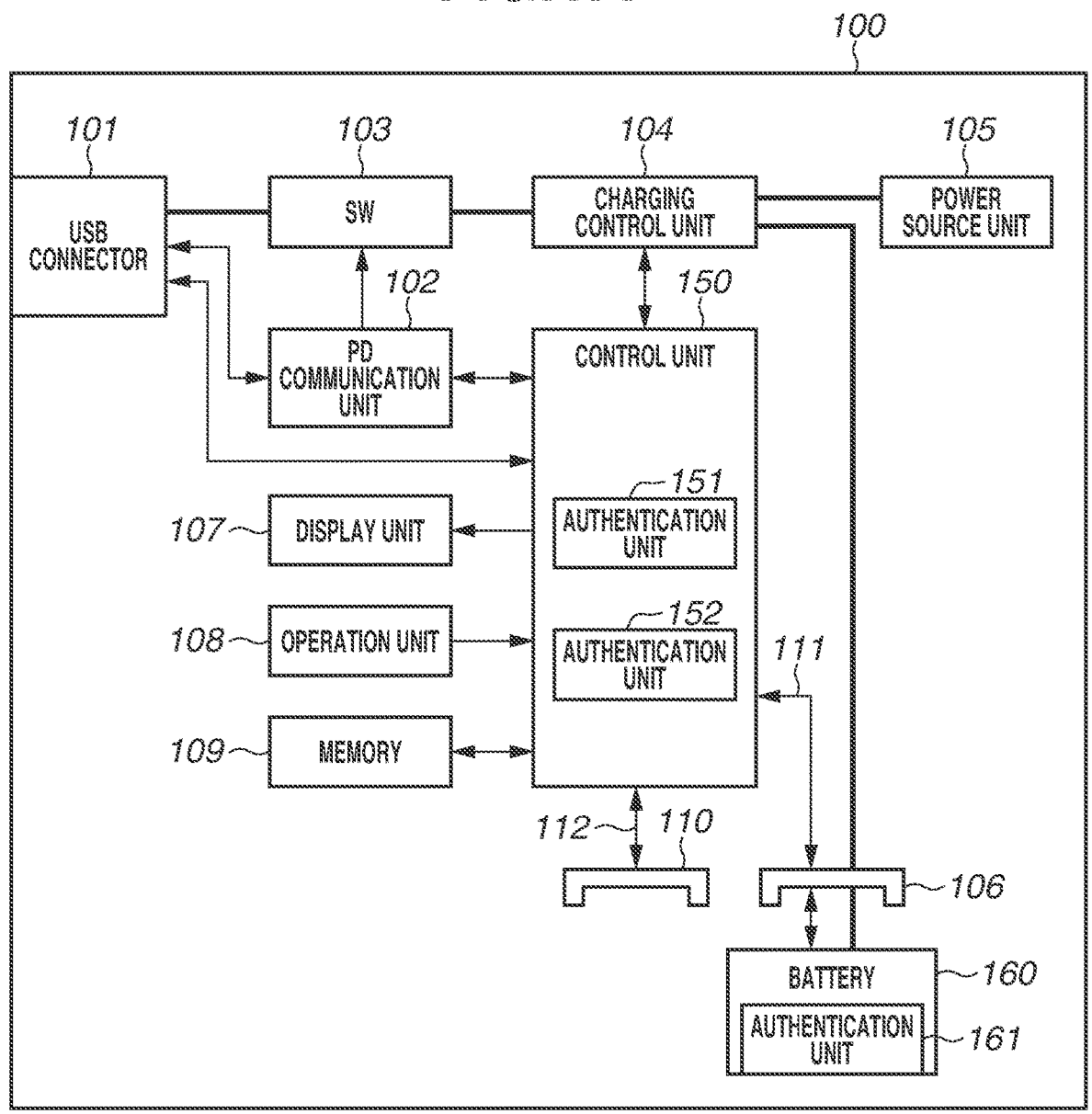
FIG. 1A is a block diagram illustrating components of an electronic apparatus 100 according to a first exemplary embodiment.
Figure 1B:
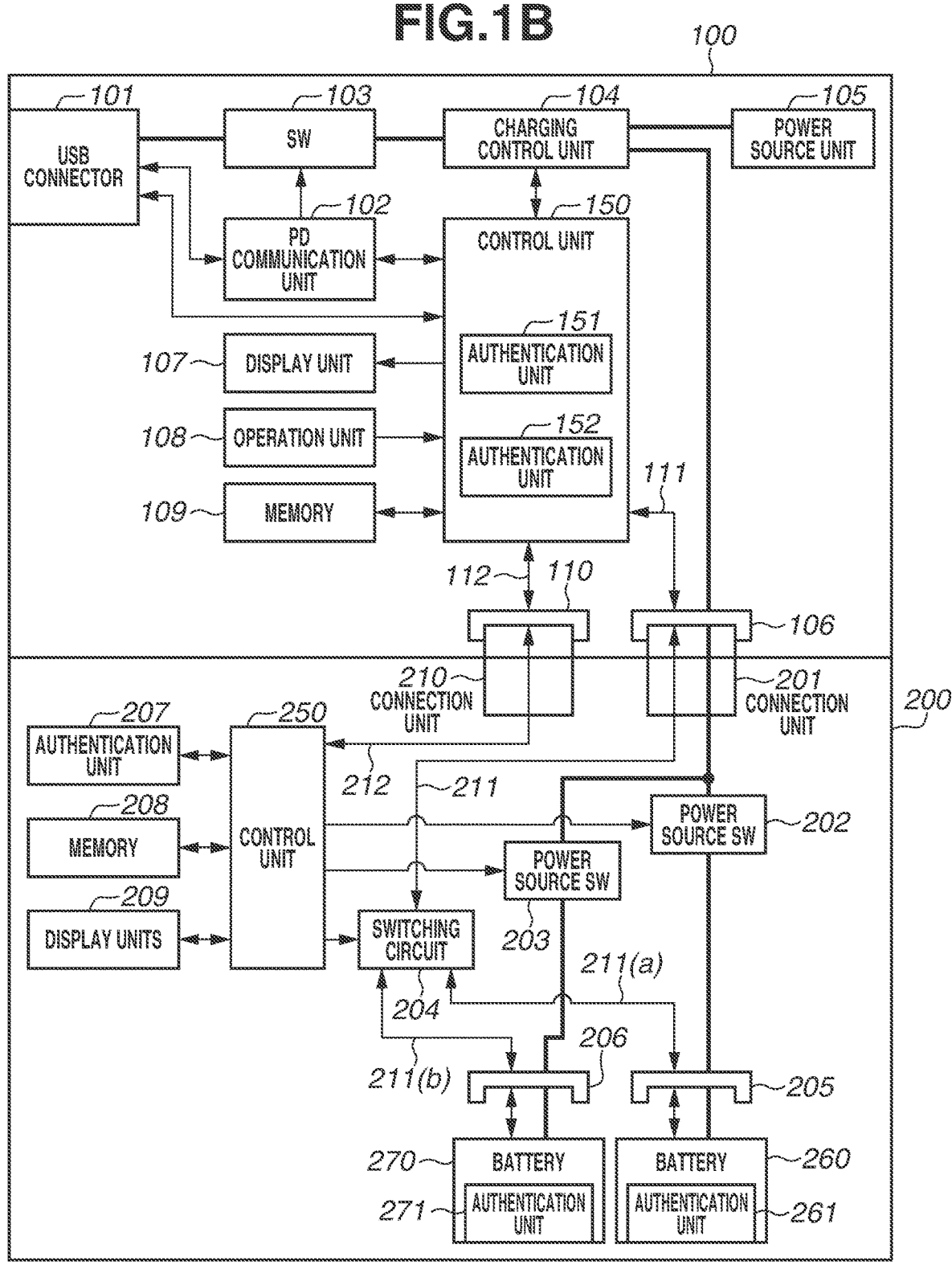
FIG. 1B is a block diagram illustrating components of an accessory apparatus 200 according to the first exemplary embodiment.

[First Exemplary Embodiment] Components of an electronic apparatus 100 and an accessory apparatus 200 as an external apparatus connected to the electronic apparatus 100 according to a first exemplary embodiment will be described with reference to FIGS. 1A and 1B.

The components of the electronic apparatus 100 will be described with reference to FIG. 1A. The electronic apparatus 100 is, for example, an electronic apparatus operable as a digital camera. A battery 160 is connectable to the electronic apparatus 100.

A Universal Serial Bus (USB) connector 101 is a receptacle-shaped USB connector. The USB connector 101 is, for example, a USB Type-C connector in the first exemplary embodiment.

A power switch 103 is a switch for switching power supply from a VBUS between ON or OFF, and for controlling the power supply from the VBUS to the components of the electronic apparatus 100. Setting the power switch 103 to OFF can lead to a low-power consumption that satisfies the power consumption specification prescribed in the USB standard. Furthermore, if an overvoltage is applied, the power switch 103 will be set to OFF to prevent the overvoltage from being applied to the subsequent circuitry. In the first exemplary embodiment, a Power Delivery (PD) communication unit 102, which will be described below, controls the power switch 103 by way of example.

Connected to a communication terminal of the USB connector 101, the PD communication unit 102 can carry out data communication based on the USB Power Delivery (PD) standard with integrated circuits (IC) embedded in an external USB adapter and USB cable. In the first exemplary embodiment, the PD communication unit 102 is connected to a Configuration Channel (CC) terminal of the USB connector 101, by way of example. The PD communication unit 102 also determines whether the connected USB adapter and USB cable comply with the USB PD standard. The PD communication unit 102 carries out negotiation communication based on the communication protocol according to the USB PD standard, and requests desired power supply to the external USB adapter. The connection destination has been described citing the USB adapter as an example thereof here, but may be a power supply apparatus such as a mobile battery, a personal computer (PC), and a tablet.

A charging control unit 104 can charge the battery 160 using the USB power supplied from the USB connector 101. Furthermore, the charging control unit 104 also allows the electronic apparatus 100 to operate by supplying the USB power fed from the USB connector 101 to a power source unit 105. The charging control unit 104 can operate on the USB power while charging the battery 160 with extra power.

In the electronic apparatus 100, a control unit 150, which will be described below, controls the charging by communicating with the charging control unit 104 and by configuring appropriate settings.

The power source unit 105 is a power source unit including a direct-current/direct-current (DC/DC) converter or another component. Power generated by the power source unit 105 is supplied to each circuit block in the electronic apparatus 100. FIG. 1A includes the power source unit 105 for the purpose of illustration, but the electronic apparatus 100 may include power source circuits.

A display unit 107 is a display unit including a liquid crystal display (LCD), a light-emitting diode (LED), a dot-matrix liquid crystal, or the like. The display unit 107 is used to, for example, display states of the electronic apparatus 100, images, and a menu screen. An operation unit 108 is an operation unit including buttons, a touch panel, or another component. The operation unit 108 is used for the control of the electronic apparatus 100. A memory 109 is used to store, for example, control programs and image data of the electronic apparatus 100.

A battery holder 106 is a battery chamber for connecting the battery 160 to the electronic apparatus 100. The control unit 150 can communicate with a microcomputer in the battery 160 and acquire information about the remaining charge of the battery 160 and information to control the charging via a communication line 111. The information to control the charging includes information about temperature in the battery 160, charging states such as charging completion, overvoltage, and overcurrent, and cell voltage. The accessory apparatus 200, which will be described below, is also connectable to the battery holder 106, and the electronic apparatus 100 can receive power supply from a battery connected to the accessory apparatus 200.

The control unit 150 controls each component of the electronic apparatus 100. The control unit 150 includes a first authentication unit 151 and a second authentication unit 152. The first authentication unit 151 performs an authentication process for determining whether the accessory apparatus 200 is a predetermined accessory apparatus (a genuine accessory apparatus) by communicating with an authentication unit in the accessory apparatus 200 connected to the electronic apparatus 100. The second authentication unit 152 performs an authentication process for determining whether the battery 160 is a predetermined battery (a genuine battery) by communicating with an authentication unit 161 in the battery 160.

A connection unit 110 is a connector portion that connects to the accessory apparatus 200 for the accessory apparatus 200 to be connected to the electronic apparatus 100. A control unit 250 in the accessory apparatus 200 connected to the connection unit 110 and the control unit 150 can communicate with each other via a communication line 112.

Next, components of the accessory apparatus 200 as the external apparatus connected to the electronic apparatus 100 will be described with reference to FIG. 1B. The accessory apparatus 200 is, for example, an electronic apparatus operating as a battery grip. A battery 260 and a battery 270 are connectable to the accessory apparatus 200.

A connection unit 201 is a unit for the connection to the electronic apparatus 100, and forms in a shape of fitting in the battery holder 106. Power in the battery 260 and the battery 270 connected to the accessory apparatus 200 is supplied to the electronic apparatus 100 via the connection unit 201. Furthermore, a communication line 211 connected to the battery 260 and the battery 270 is also included in the connection unit 201 to acquire the battery information about the battery 260 and the battery 270 connected to the accessory apparatus 200.

A connection unit 210 is a unit for the connection to the electronic apparatus 100, and is shaped to fit in the connection unit 110 of the electronic apparatus 100. A communication line 212 connected to the control unit 150 and the control unit 250 is included in the connection unit 210.

A power switch 202 is a power switch between the connection unit 201 and a battery holder 205, and used to supply power from the battery 260 connected to the battery holder 205 to the electronic apparatus 100. The power switch 202 is also set to ON or OFF when the battery 260 connected to the accessory apparatus 200 is charged by receiving power from the USB connector 101 of the electronic apparatus 100. The control unit 250 performs control for setting the power switch 202 to ON or OFF based on control by the control unit 150 of the electronic apparatus 100 via the communication lines 112 and 212.

A power switch 203 is a power switch between the connection unit 201 and a battery holder 206, and used to supply power from the battery 270 connected to the battery holder 206 to the electronic apparatus 100. The power switch 203 is also set to ON or OFF when the battery 270 connected to the accessory apparatus 200 is charged by receiving power from the USB connector 101 of the electronic apparatus 100. The control unit 250 performs control for setting the power switch 203 to ON or OFF based on control by the control unit 150 via the communication lines 112 and 212.

A switching circuit 204 is a circuit for switching between the communication lines connected between the control unit 150 and a target battery. The switching circuit 204 is between the connection unit 201, and the battery holder 205 and the battery holder 206. The switching circuit 204 is controlled by the control unit 250 based on control by the control unit 150 via the communication lines 112 and 212.

When attempting to communicate with the microcomputer in the battery 260 connected to the accessory apparatus 200, the control unit 150 controls the switching circuit 204 to connect the communication line 211 and a communication line 211(a). The second authentication unit 152 of the control unit 150 can determine whether the battery 260 is a predetermined battery (a genuine battery) for authentication by communicating with an authentication unit 261 in the battery 260.

On the other hand, when attempting to communicate with the microcomputer in the battery 270 connected to the accessory apparatus 200, the control unit 150 controls the switching circuit 204 to connect the communication line 211 and a communication line 211(b). The second authentication unit 152 can determine whether the battery 270 is a predetermined battery (a genuine battery) by communicating with an authentication unit 271 in the battery 270.

The first authentication unit 151 in the control unit 150 of the electronic apparatus 100 can determine whether the accessory apparatus 200 is a predetermined accessory apparatus (a genuine accessory apparatus) for authentication by communicating with an authentication unit 207 via the control unit 250 of the accessory apparatus 200.

A memory 208 is used to store, for example, a control program for the accessory apparatus 200. Each of display units 209 includes an LED or another component, and is used to indicate a charging state of the battery (260 or 270) connected to the accessory apparatus 200.

Figure 2A:
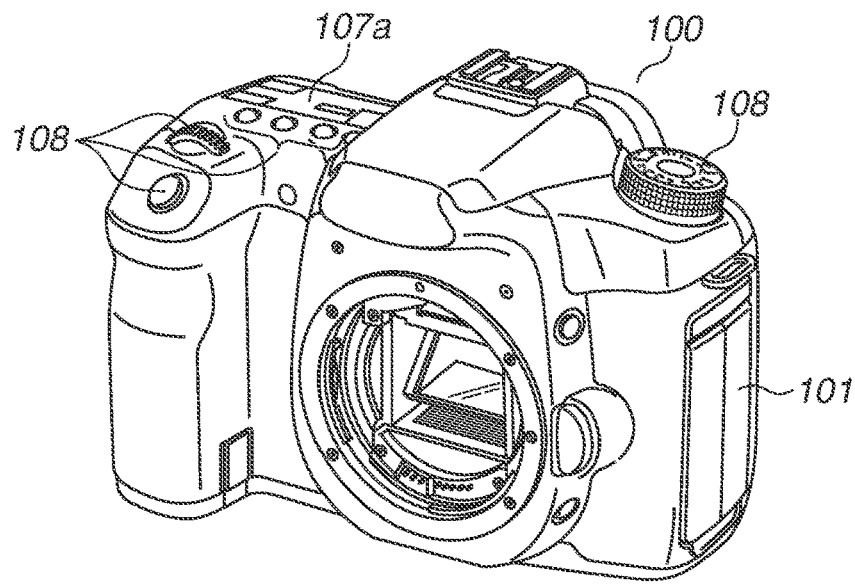
FIG. 2A illustrates an exterior appearance of the electronic apparatus 100.
Figure 2B:
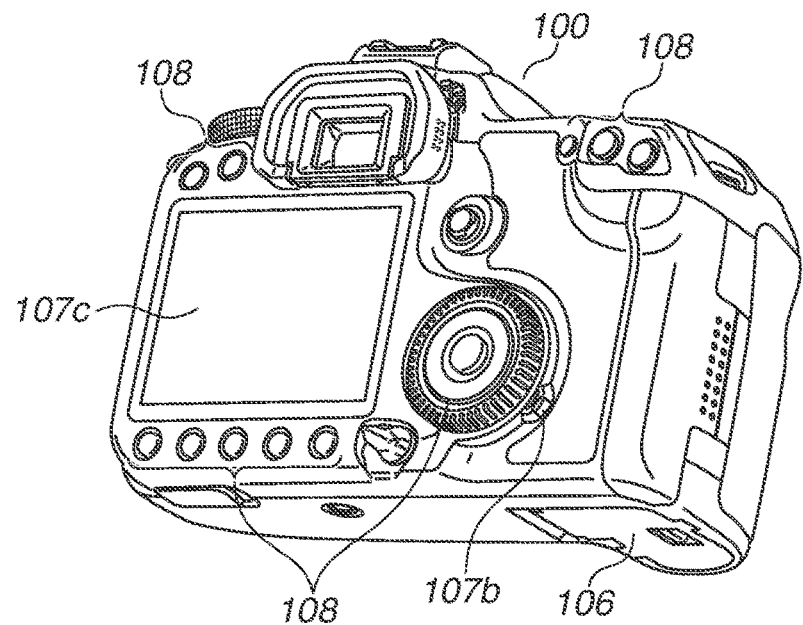
FIG. 2B illustrates an exterior appearance of the electronic apparatus 100.

FIGS. 2A and 2B illustrate exterior appearances of the electronic apparatus 100. It is assumed that the USB connector 101 is a USB Type-C connector in the first exemplary embodiment.

A display unit 107a is a display unit of the electronic apparatus 100, and includes a dot-matrix liquid crystal. For example, information about imaging modes, imaging conditions, battery remaining charge, charging states of batteries, and other information are displayed on the display unit 107a. A display unit 107b is a display unit on the electronic apparatus 100, and is formed of LEDs. For example, the charging state of a connected battery is displayed by the display unit 107b. As an example, the display unit 107b indicates charging in progress with the green LED illuminating, a charging error with the green LED blinking, and charging completion with the LED off. A display unit 107c is a display unit on the electronic apparatus 100, and is formed of an LCD. For example, live view images or captured images generated by the electronic apparatus 100, menu information, charging states of batteries connected to the electronic apparatus 100 or the accessory apparatus 200, and other information are displayed on the display unit 107c.

A battery is connected in the battery holder 106. The battery holder 106 forms in a shape of fitting in the accessory apparatus 200, as will be described below. The operation unit 108 is an operation unit of the electronic apparatus 100, and includes a dial, a button, and/or other components. The operation unit 108 is used for control of the electronic apparatus 100. For example, a user controls the electronic apparatus 100 by operating the operation unit 108 while viewing a message screen to the user on the display unit 107c.

Figure 2C:
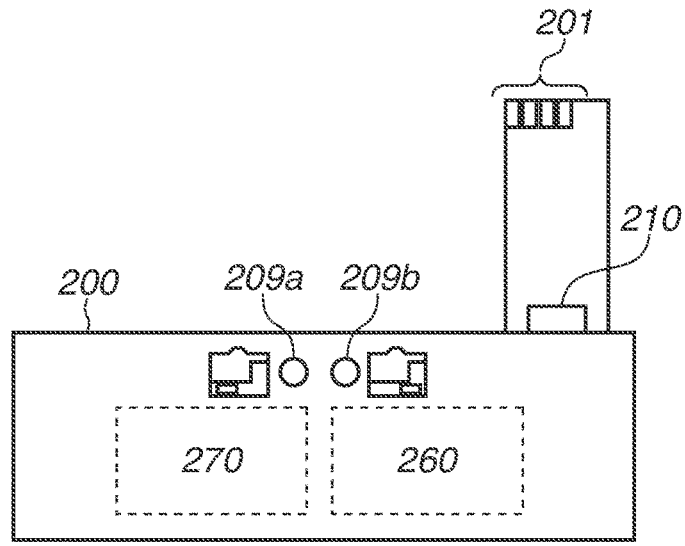
FIG. 2C illustrates an exterior appearance of the accessory apparatus 200.

FIG. 2C illustrates an exterior appearance of the accessory apparatus 200.

The connection unit 201 is a unit for the connection to the electronic apparatus 100, and forms in a shape of fitting in the battery holder 106 of the electronic apparatus 100. For example, power from batteries connected to the accessory apparatus 200 is supplied to the electronic apparatus 100 via the connection unit 201. Furthermore, the communication line for communicating with connected batteries is also connected via the connection unit 201.

The connection unit 210 is a unit for the connection to the electronic apparatus 100, and forms in a shape of fitting in the connection unit 110 of the electronic apparatus 100. For example, the control unit (the microcomputer) 150 in the electronic apparatus 100 and the control unit (the microcomputer) 250 in the accessory apparatus 200 communicate with each other via the connection unit 210. The electronic apparatus 100 may not include the connection unit 210, and the accessory apparatus 200 may include a communication line for the communication between the microcomputers in the connection unit 201.

The battery 260 and the battery 270 are connected to the accessory apparatus 200. The following is a description of the accessory apparatus 200 with two batteries connected thereto. But one battery or two or more batteries may be used.

A display unit 209a and a display unit 209b are display units of the accessory apparatus 200, and each of the display units 209a and 209b includes an LED or another component. The charging state of the battery 260 is indicated by the display unit 209b, and the charging state of the battery 270 is indicated by the indication unit 209a. As an example, each of the display units 209a and 209b indicates charging in progress with the green LED illuminating, a charging error with the green LED blinking, and charging completion with the LED off.

Figure 2D:
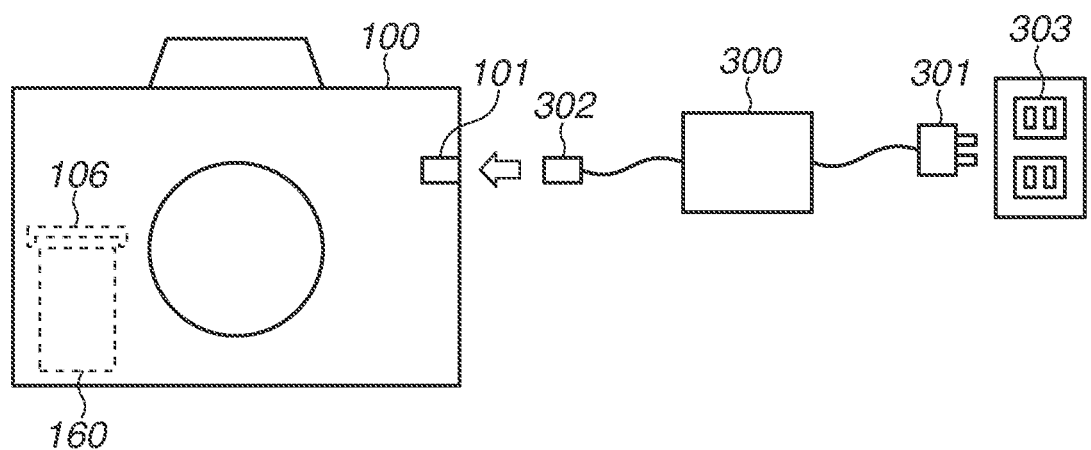
FIG. 2D illustrates an example of a connection of the electronic apparatus 100 and a power supply apparatus 300.

FIG. 2D illustrates an example of connection between the electronic apparatus 100 and a power supply device 300. The power supply device 300 is, for example, operable as a USB adapter.

The electronic apparatus 100 allows the battery 160 to be connected to the battery holder 106. The battery 160 is a rechargeable battery such as a lithium ion battery. Furthermore, The USB connector 101 on the electronic apparatus 100 connects to the power supply device 300, which makes it possible to supply power to the electronic apparatus 100 and charge the battery 160 using extra power supplied to the electronic apparatus 100.

The power supply device 300 includes an alternating-current (AC) plug 301 and a plug-shaped USB connector 302. The AC plug 301 is connected to a commercial power source 303, and power from the commercial power source 303 is converted into a DC power source in the power supply device 300 and is supplied from the USB connector 302. The electronic apparatus 100 can detect the voltage and the current supplied from the power supply device 300 based on the voltage level of a not-illustrated communication line or data communication.

Figure 2E:
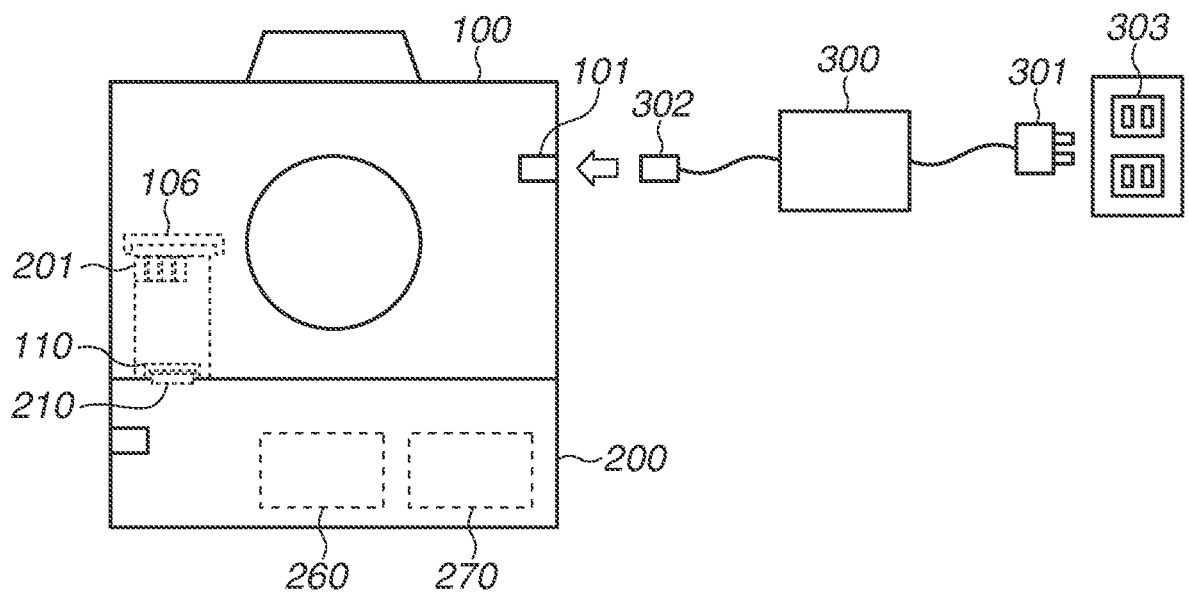
FIG. 2E illustrates an example of a connection of the electronic apparatus 100, the accessory apparatus 200 and the power supply apparatus 300.

FIG. 2E illustrates an example of connection of the electronic apparatus 100, the accessory apparatus 200, and the power supply device 300.

The accessory apparatus 200 is connectable to the battery holder 106 of the electronic apparatus 100 in place of a battery, making it possible for the electronic apparatus 100 to receive the power supply from the batteries 260 and 270 connected in the accessory apparatus 200. The batteries 260 and 270 is chargeable with the power supply device 300 connected to the USB connector 101 of the electronic apparatus 100 while the electronic apparatus 100 and the accessory apparatus 200 are connected to each other.

Next, accessory authentication and battery authentication performed with the electronic apparatus 100 and the accessory apparatus 200 connected to each other will be described with reference to FIGS. 3A and 3B.

Step S300 is a step in which the control unit 150 of the electronic apparatus 100 performs an accessory authentication. In step S300, the first authentication unit 151 of the control unit 150 compares data with the authentication unit 207 connected to the control unit 250, thereby performing an accessory authentication. If the accessory authentication is successful, the accessory apparatus 200 will become controllable by the control unit 150.

Step S301 is a step in which the control unit 150 determines whether the accessory authentication performed in step S300 is successful. If the control unit 150 determines that the accessory authentication is successful (YES in step S301), the control unit 150 proceeds to step S306. Otherwise (NO in step S301), the control unit 150 proceeds to step S302.

Step S302 is a step in which the control unit 150 displays a confirmation screen to the user on the display unit 107c of the electronic apparatus 100. The accessory authentication failure may be a failure in communication between the microcomputers due to dust on a contact of the accessory apparatus 200. With a possible malfunction of the accessory apparatus 200, the user is to be prompted to check that. In an example, as an example, the control unit 150 prompts the user to check the accessory apparatus 200 by displaying "Battery Grip Communication Error: XXX does not guarantee the operation and the safety of the battery. The charging of the battery will not be available. "Do you want to continue using it?" The user inputs "NO" or "YES" using the dial or the button of the operation unit 108 on the electronic apparatus 100. Next, the control unit 150 proceeds to step S303.

Step S303 is a step branches according to the user input in step S302. If the control unit 150 determines that "YES" is selected (YES in step S303), the control unit 150 proceeds to step S304. If the control unit 150 determines that "NO" is selected (NO in step S303), the control unit 150 proceeds to step S305.

In step S304, the control unit 150 performs the control to permit the batteries 260 and 270 connected to the accessory apparatus 200 to be discharged while to restrict the batteries 260 and 270 from being charged in an operation mode of the electronic apparatus 100. If the user allows the use of the batteries 260 and 270 connected to the accessory apparatus 200 on the acknowledgment that the accessory authentication has failed, the electronic apparatus 100 permits the batteries 260 and 270 to be discharged, while the inhibition of charging the batteries 260 and 270 connected to the accessory apparatus 200 remains unchanged. The control unit 150 sets the power switch 202 or 203 to ON via the control unit 250 to supply power from the target battery to the electronic apparatus 100. On the other hand, the control unit 150 controls the charging control unit 104 to inhibit the batteries 260 and 270 connected to the accessory apparatus 200 from being charged. If the accessory authentication fails, the switching circuit 204, which switches between the communication lines for communicating with the battery 260 or 270, may be unable to operate correctly in the accessory apparatus 200, which makes it impossible to guarantee communication with a desired battery. As a consequence, if the accessory authentication fails, the battery authentication that will be descried below will not be performed in the first exemplary embodiment by way of example. After making the discharging and charging settings in step S304, the flowchart is ended.

In step S305, the control unit 150 performs control of the restriction of charging and discharging the batteries 260 and 270 connected to the accessory apparatus 200 in an operation mode of the electronic apparatus 100. The control unit 150 sets the power switches 202 and 203 to OFF via the control unit 250 to inhibit power supply from the target battery to the electronic apparatus 100. Furthermore, the control unit 150 controls the charging control unit 104 to inhibit the batteries 260 and 270 connected to the accessory apparatus 200 from being charged. Upon making the discharging and charging settings in step S305, the flowchart is ended.

In step S306, the control unit 150 controls the switching circuit 204 via the control unit 250 to switch the battery communication path to the left path (to the battery 270). Next, the control unit 150 proceeds to step S307.

Step S307 is a step in which the control unit 150 performs a battery authentication of the left battery (270) in the accessory apparatus 200. In step S307, the second authentication unit 152 compares data with the authentication unit 271 in the battery 270 connected to the accessory apparatus 200, thereby performing a battery authentication of the left battery (the battery 270). The second authentication unit 152 is an authentication unit for battery authentication, and is an authentication unit different from the first authentication unit 151 for accessory authentication. Next, the control unit 150 proceeds to step S308.

Step S308 is a step in which the control unit 150 determines whether the battery authentication performed in step S307 is successful. If the control unit 150 determines that the battery authentication is successful (YES step S308), the control unit 150 proceeds to step S317. Otherwise (NO in step S308), the control unit 150 proceeds to step S309.

Step S309 is a step in which the control unit 150 displays a confirmation screen to the user on the display unit 107c of the electronic apparatus 100. The battery authentication failure of the battery 270 may be a failure in communication between the microcomputer and the battery 270 due to dust on a contact of the battery 270. As the battery 270 may malfunction, the user is to be prompted to check that. In an example, the electronic apparatus 100 prompts the user to check the battery 270 by displaying "Battery Communication Error: Is the logo of XXX placed on the left battery in use?" by way of example. The user inputs "NO" or "YES" with the dial or the button of the operation unit 108 of the electronic apparatus 100. Next, the control unit 150 proceeds to step S310.

Step S310 is a step branches according to the user input in step S309. If the control unit 150 determines that "NO" is selected (NO in step S310), the control unit 150 proceeds to step S311. If the control unit 150 determines that "YES" is selected (YES in step S310), the control unit 150 proceeds to step S312.

Step S311 is a step in which the control unit 150 displays a confirmation screen to the user on the display unit 107c. If the battery authentication of the battery 270 fails, the battery 270 may be a battery different from a predetermined battery. If the user uses the batteries 260 and 270 connected to the accessory apparatus 200 on the acknowledgment that the battery 270 is not a predetermined battery, the electronic apparatus 100 permits the batteries 260 and 270 to be discharged. On the other hand, with a possible failure in safety charging of the battery different from a predetermined battery, the electronic apparatus 100 does not charge the batteries 260 and 270 connected to the accessory apparatus 200. In an example, the electronic apparatus 100 prompts the user to check the battery 270 by displaying "XXX does not guarantee the operation and the safety of this battery. Do you want to continue using it?" by way of example. The user inputs "NO" or "YES" with the dial or the button of the operation unit 108 of the electronic apparatus 100. Next, the control unit 150 proceeds to step S313.

Step S313 is a step branches according to the user input in step S311. If the control unit 150 determines that "YES" is selected (YES in step S313), the control unit 150 proceeds to step S315. If the control unit 150 determines that "NO" is selected (NO in step S313), the control unit 150 proceeds to step S316.

Step S312 is a step in which the control unit 150 displays a confirmation screen to the user on the display unit 107c. If the battery authentication of the battery 270 fails, the battery 270 may be a battery different from a predetermined battery. On the other hand, as the user selects that the battery 270 has a logo indicating that this battery is a predetermined battery, the battery 270 in use is highly likely to be an imitation product. For the safety of the electronic apparatus 100, the user is to be prompted to refrain from using the battery 270. In an example, the electronic apparatus 100 presents to the user a warning display "The battery in use may be an imitation product. Please contact the customer support center. The power supply will be stopped for safety." by way of example. Next, the control unit 150 proceeds to step S314.

Step S314 is a step for waiting for an input from the user after the warning display is presented to the user in step S312. If the control unit 150 determines that "OK" is input (YES in step S314), the control unit 150 proceeds to step S316. Otherwise (NO in step S314), the control unit 150 repeats step S314.

In step S315, the control unit 150 performs control of the restriction of charging the batteries 260 and 270 connected to the accessory apparatus 200 while permitting them to be discharged in an operation mode of the electronic apparatus 100. If the user permits the use of the batteries 260 and 270 on the acknowledgment that the battery authentication of the battery 270 has failed, the electronic apparatus 100 permits the batteries 260 and 270 to be discharged. However, the electronic apparatus 100 inhibits the batteries 260 and 270 connected to the accessory apparatus 200 from being charged even with the user's acknowledgment. The control unit 150 sets the power switch 202 or 203 to ON via the control unit 250 to supply power from the target battery to the electronic apparatus 100. On the other hand, the control unit 150 controls the charging control unit 104 to inhibit the batteries 260 and 270 connected to the accessory apparatus 200 from being charged. Next, the control unit 150 proceeds to step S317.

In step S316, the control unit 150 performs control of the restriction of charging and discharging the batteries 260 and 270 connected to the accessory apparatus 200 in an operation mode of the electronic apparatus 100. The control unit 150 sets the power switches 202 and 203 to OFF via the control unit 250 to inhibit the power supply from the target battery to the electronic apparatus 100. Furthermore, the control unit 150 controls the charging control unit 104 to inhibit the batteries 260 and 270 connected to the accessory apparatus 200 from being charged. Upon making the discharging and charging settings in step S316, the flowchart is ended.

In step S317, the control unit 150 controls the switching circuit 204 via the control unit 250 to switch the battery communication path to the right path (to the battery 260). Next, the control unit 150 proceeds to step S318.

Step S318 is a step in which the control unit 150 performs a battery authentication of the right battery (260) in the accessory apparatus 200. In step S318, the second authentication unit 152 of the control unit 150 compares data with the authentication unit 261 in the battery 260 connected to the accessory unit 200, thereby performing a battery authentication of the right battery (the battery 260). Next, the control unit 150 proceeds to step S319.

Step S319 is a step in which the control unit 150 determines whether the battery authentication performed in step S318 is successful. If the control unit 150 determines that the battery authentication is successful in step S319 (YES step S319), the control unit 150 proceeds to step S326. Otherwise (NO in step S319), the control unit 150 proceeds to step S320.

Step S320 is a step in which the control unit 150 displays a confirmation screen to the user on the display unit 107c. The battery authentication failure of the battery 260 may be a failure in communication between the microcomputer and the battery 260 due to dust on a contact of the battery 260. With a possible malfunction of the battery 260, the user is to be prompted to check that. In an example, the electronic apparatus 100 prompts the user to check the battery 260 by displaying "Battery Communication Error: Is the logo of XXX placed on the right battery in use?" by way of example. The user inputs "NO" or "YES" with the dial or the button of the operation unit 108 of the electronic apparatus 100. Next, the control unit 150 proceeds to step S321.

Step S321 is a step branches according to the user input in step S320. If the control unit 150 determines that "NO" is selected (NO in step S321), the control unit 150 proceeds to step S322. If the control unit 150 determines that "YES" is selected (YES in step S321), the control unit 150 proceeds to step S323.

A similar process to step S311 is performed in step S322, and the description thereof will be omitted here. Next, the control unit 150 proceeds to step S324.

Step S324 is a step branches according to the user input in step S322. If the control unit 150 determines that "YES" is selected (YES in step S324), the control unit 150 proceeds to step S327. If the control unit 150 determines that "NO" is selected (NO in step S324), the control unit 150 proceeds to step S328.

A similar process to step S312 is performed in step S323, and the description thereof will be omitted here. Next, the control unit 150 proceeds to step S325.

Step S325 is a step for waiting for an input from the user after the warning display is presented to the user in step S323. If the control unit 150 determines that "OK" is input (YES in step S325), the control unit 150 proceeds to step S328. Otherwise (NO in step S325), the control unit 150 repeats step S325.

In step S326, the control unit 150 permits the batteries 260 and 270 connected to the accessory apparatus 200 to be discharged and charged in an operation mode of the electronic apparatus 100. The control unit 150 sets the power switch 202 or 203 to ON via the control unit 250 to supply power from the target battery to the electronic apparatus 100. Furthermore, the control unit 150 controls the charging control unit 104 to permit the batteries 260 and 270 connected to the accessory apparatus 200 to be charged. If a predetermined accessory apparatus and predetermined batteries are used, the control unit 150 will enter this step, permitting charging and discharging of the batteries 260 and 270 connected to the accessory apparatus 200. Upon making the discharging and charging settings in step S326, the flowchart is ended.

In step S327, the control unit 150 performs control of the restriction of charging the batteries 260 and 270 connected to the accessory apparatus 200 while permitting them to be discharged in an operation mode of the electronic apparatus 100. The control unit 150 sets the power switch 202 or 203 to ON via the control unit 250 to supply power from the target battery to the electronic apparatus 100. On the other hand, the control unit 150 controls the charging control unit 104 to inhibit the batteries 260 and 270 connected to the accessory apparatus 200 from being charged. Upon making the discharging and charging settings in step S327, the flowchart is ended.

In step S328, the control unit 150 performs control of the restriction of both charging and discharging the batteries 260 and 270 connected to the accessory apparatus 200 in an operation mode of the electronic apparatus 100. The control unit 150 sets the power switches 202 and 203 to OFF via the control unit 250 to inhibit power supply from the target battery to the electronic apparatus 100. Furthermore, the control unit 150 controls the charging control unit 104 to inhibit the batteries 260 and 270 connected to the accessory apparatus 200 from being charged. Upon making the discharging and charging settings in step S328, the flowchart is ended.

Figure 3A:
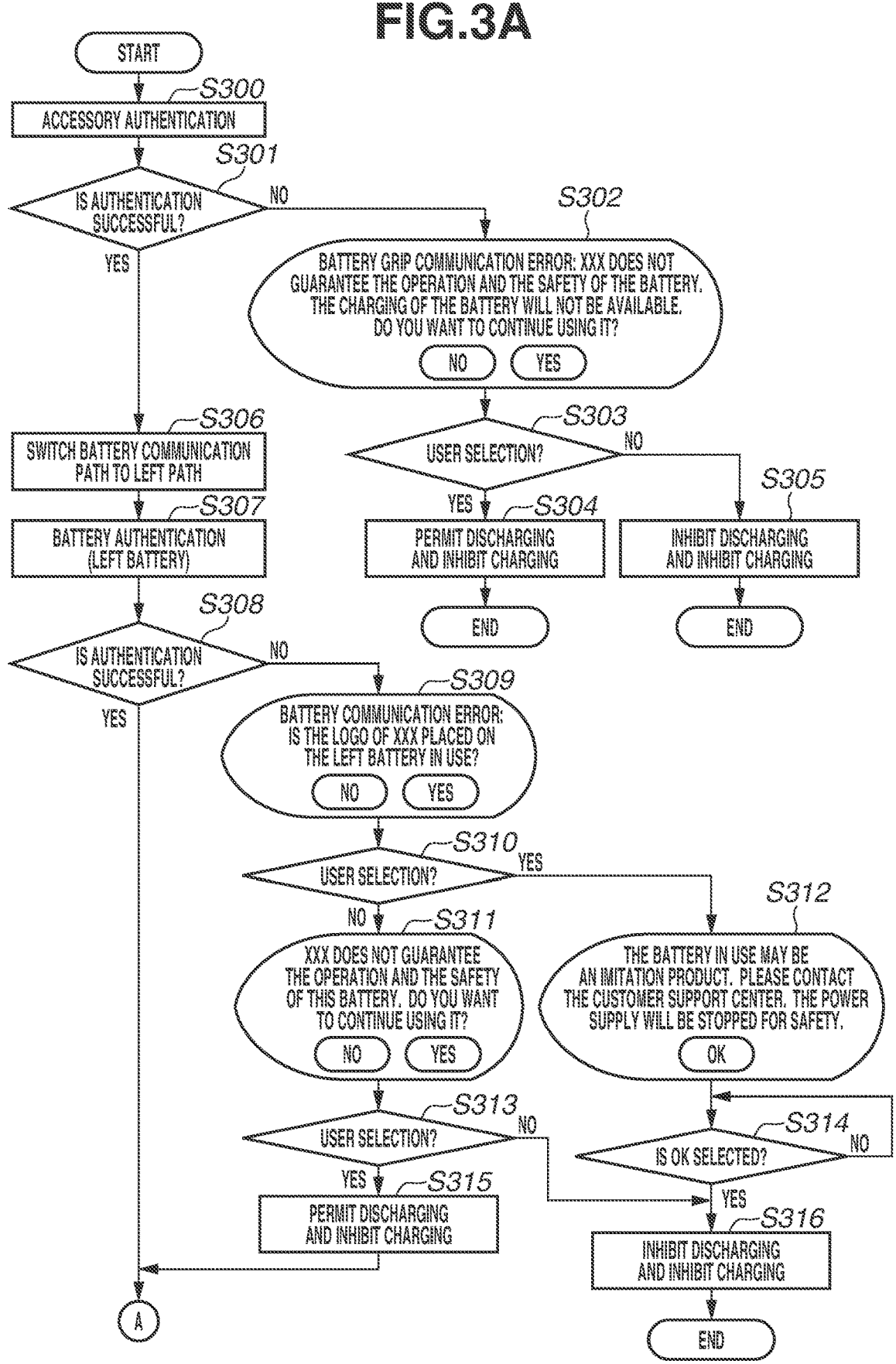
FIGS. 3A and 3B are a flowchart illustrating a process performed by the electronic apparatus 100.
Figure 3B:
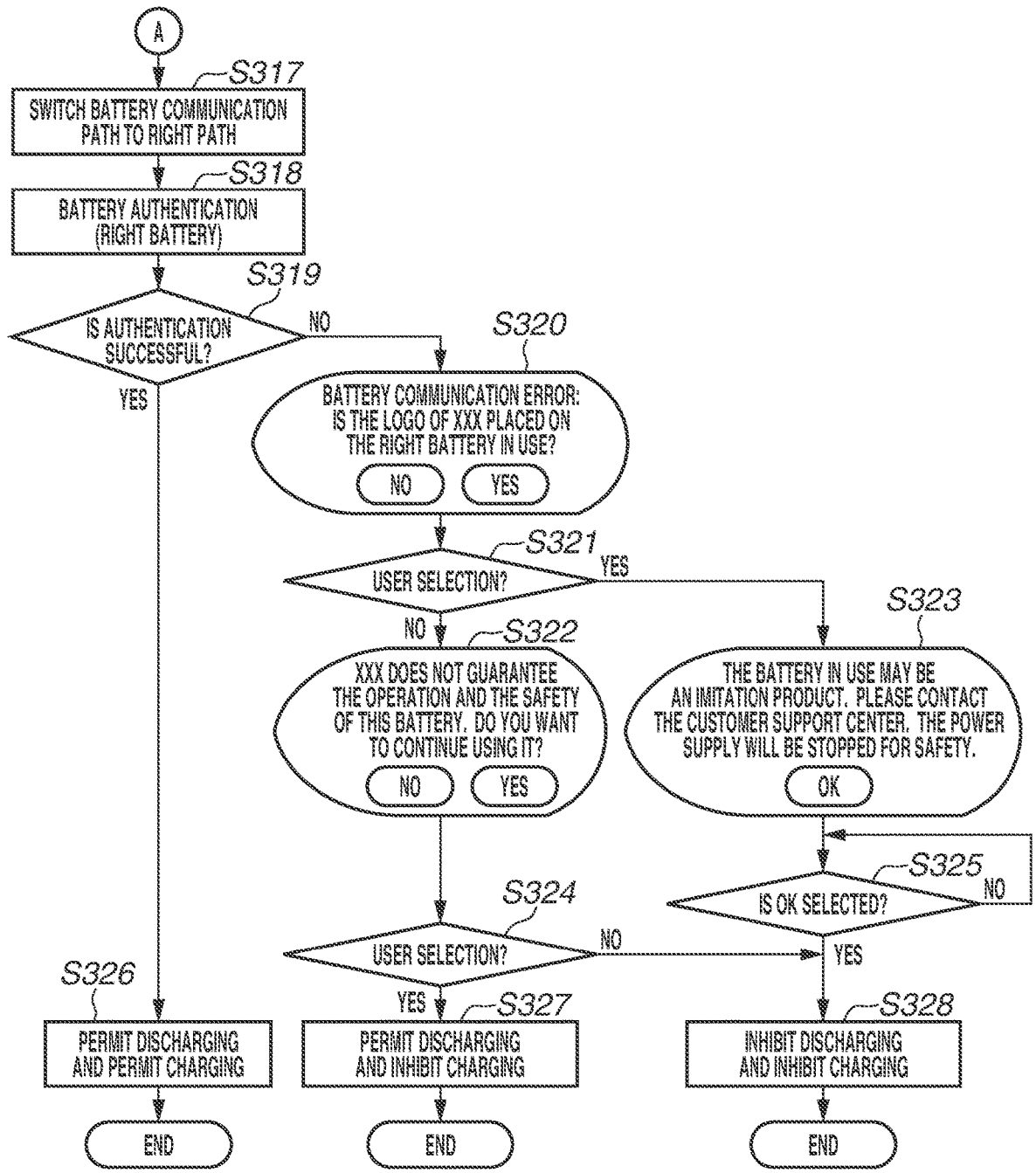

According to the flowcharts illustrated in FIGS. 3A and 3B, the accessory authentication is performed in step S300 prior to the battery authentication in step S307 and step S318. This order enables proper control of the apparatus without performing the battery authentication with a failure in an accessory authentication. The first exemplary embodiment has been described referring to the example in which a battery authentication is not performed if an accessory authentication fails by way of example. Alternatively, a battery authentication may be performed, with the result not used.

FIGS. 4A, 4B, 4C, and 4D illustrate examples of battery information displayed on the display unit 107c.

Figure 4A:
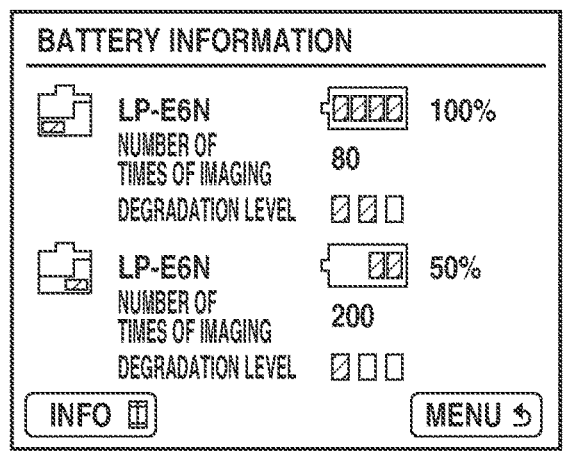
FIGS. 4A to 4D illustrate examples of battery information displayed on a display unit 107c of the electronic apparatus.

FIG. 4A illustrates an example of a menu screen with two authenticated batteries (the right one 260 and the left one 270) connected to the accessory apparatus 200. The menu screen indicates the remaining charge of each of the left and right batteries and information regarding each of the batteries (the number of times of imaging and the degradation level).

Figure 4B:
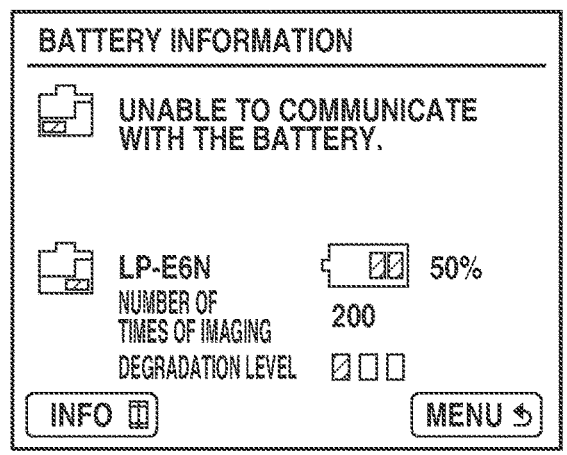

FIG. 4B illustrates an example of a menu screen with one authenticated battery (the right one 260) connected to the accessory apparatus 200. The menu screen will be displayed if no battery is connected in the left side or if the left battery is a predetermined battery uncommunicable due to, for example, dust on a contact of the battery. In addition, the menu screen will be also displayed likewise if an unauthenticated battery or a battery with no remaining battery charge is connected in the right side.

Figure 4C:
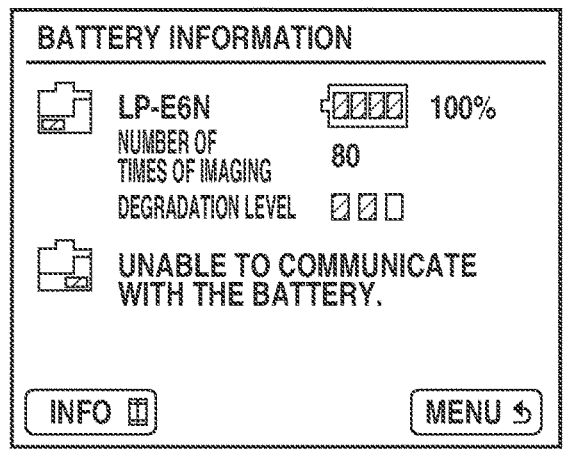

FIG. 4C illustrates an example of a menu screen with one authenticated battery (the left one 270) connected to the accessory apparatus 200. The menu screen will be displayed if no battery is connected in the right side or if the right battery is a predetermined battery uncommunicable due to, for example, dust on a contact of the battery. In addition, the menu screen will be also displayed likewise if an unauthenticated battery or a battery with no remaining battery charge is connected in the right side.

Figure 4D:
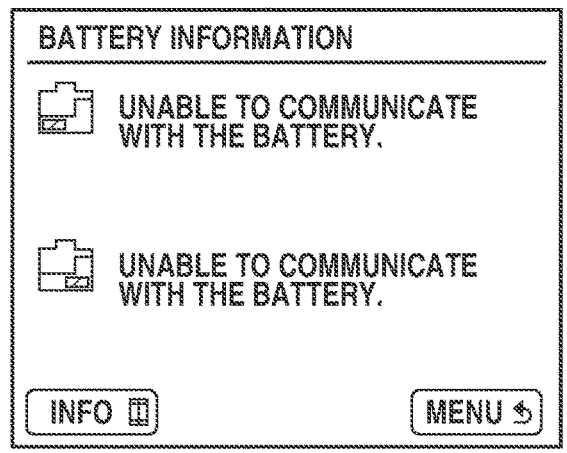

FIG. 4D illustrates an example of a menu screen if the batteries connected to the accessory apparatus 200 are uncommunicable due to, for example, dust on contacts of them. The display illustrated in FIG. 4D is presented in the first exemplary embodiment if the accessory authentication fails. Besides that, the menu screen will be also displayed likewise if the batteries connected in the left side and the right side are unauthenticated batteries or batteries with no battery remaining charge.

As illustrated in FIGS. 4A, 4B, 4C, and 4D, if whether the accessory apparatus 200 is a predetermined accessory apparatus is not determinable for authentication, the electronic apparatus 100 displays information indicating that battery communication is unable to establish even with predetermined batteries set therein. This is because the switching circuit 204 or another component for the battery communication may not be controlled correctly. Looking at the information, the user can check, for example, connection terminals of the accessory apparatus 200 for dust thereon, thereby using the apparatus correctly.

The first exemplary embodiment has been described referring to the example in which the accessory apparatus 200 connected to the electronic apparatus 100 operates as the battery grip. However, the accessory apparatus 200 connected to the electronic apparatus 100 is not limited to the battery grip. The accessory apparatus 200 may be any type of accessory apparatus to which a battery is connected and with which the battery can supply power to the electronic apparatus 100.

[Second Exemplary Embodiment] A second exemplary embodiment will be described. The various functions, processes procedures, or methods described in the first exemplary embodiment are also useable through execution of a program by a personal computer, a microcomputer, a central processing unit (CPU), or a microprocessor. Hereinafter, in the second exemplary embodiment, the personal computer, the microcomputer, the CPU, or the microprocessor will be referred to as a "computer X". Furthermore, in the second exemplary embodiment, the program for controlling the computer X and carrying out the various functions, processes, or methods described in the first exemplary embodiment will be referred to as a "program Y".

The various functions, processes, or methods described in the first exemplary embodiment are used through the execution of the program Y by the computer X. In this case, the program Y is supplied to the computer X via a computer-readable storage medium. The computer-readable storage medium according to the second exemplary embodiment includes at least one of a hard disk device, a magnetic storage device, an optical storage device, a magneto-optical storage device, a memory card, a volatile memory, or a nonvolatile memory. The computer-readable storage medium according to the second exemplary embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-079376, filed Apr. 28, 2020, which is hereby incorporated by reference herein in its entirety.

What is claimed is:

1. An electronic apparatus comprising:
a connector to which an external apparatus is connected, wherein a battery is detachably connected to the external apparatus;
a Central Processing Unit (CPU); and
a memory that stores a program which, when executed by the CPU, causes the electronic apparatus to function as:
a first authentication unit that performs a first authentication process for determining whether the external apparatus connected to the connector is a predetermined external apparatus;
a second authentication unit that performs a second authentication process for determining whether the battery connected to the external apparatus is a predetermined battery; and
a control unit that performs a control in accordance with a result of the first authentication process by the first authentication unit such that the battery is permitted to be discharged but is restricted from being charged regardless of whether the battery is the predetermined battery, in a case where it is determined that the external apparatus is not the predetermined external apparatus by the first authentication unit.

2. The apparatus according to claim 1, wherein the control unit displays information indicating that the apparatus is uncommunicable with the external apparatus and information for inquiring of a user about whether the user continues using the external apparatus on a display in the case where it is determined that the external apparatus is not the predetermined external apparatus,
wherein the control unit permits the battery to be discharged but restricts the battery from being charged upon an instruction of continuously using the apparatus, and
wherein the control unit inhibits the battery from being discharged upon an instruction of not continuously using the apparatus.

3. The apparatus according to claim 1, wherein the control unit displays information indicating that the apparatus stops communication with the external apparatus on a display unit in the case where it is determined that the external apparatus is not the predetermined external apparatus.

4. The apparatus according to claim 1, wherein the control unit displays information indicating that the apparatus is uncommunicable with the external apparatus on a display unit in the case where it is determined that the external apparatus is not the predetermined external apparatus.

5. The apparatus according to claim 1, wherein the control unit displays information indicating that the apparatus is uncommunicable with the battery and information for inquiring of a user about whether the user continues using the external apparatus on a display unit, in a case where it is determined that the battery is not the predetermined battery by the second authentication unit,
wherein the control unit permits the battery to be discharged but restricts the battery from being charged upon an instruction of continuously using the apparatus, and
wherein the control unit inhibits the battery from being discharged upon an instruction of not continuously using the external apparatus.

6. The electronic apparatus according to claim 1, wherein the program, when executed by the CPU, further causes the electronic apparatus to function as:
a power receiving unit that receives power from the battery connected to the external apparatus; and
a charging unit that charges the battery connected to the external apparatus.

7. The electronic apparatus according to claim 1, wherein the program, when executed by the CPU, further causes the electronic apparatus to function as:
a communication unit that communicates with the external apparatus and the battery connected to the external apparatus,
wherein the first authentication unit performs the first authentication process by communicating with the external apparatus via the communication unit, and
wherein the second authentication unit performs the second authentication process by communicating with the battery via the communication unit.

8. The electronic apparatus according to claim 1, wherein the control unit performs a control such that the second authentication process by the second authentication unit is not performed in the case where it is determined that the external apparatus is not the predetermined external apparatus by the first authentication unit.

9. A method comprising:
performing a first authentication process for determining whether an external apparatus connected to a connector is a predetermined external apparatus;
performing a second authentication process for determining whether a battery connected to the external apparatus is a predetermined battery; and
performing a control in accordance with a result of the first authentication process such that the battery is permitted to be discharged but is restricted from being charged regardless of whether the battery is the predetermined battery, in a case where it is determined that the external apparatus is not the predetermined external apparatus by the performing the first authentication process.

10. The method according to claim 9, further comprising:
displaying information indicating that an apparatus is uncommunicable with the external apparatus and information for inquiring of a user about whether the user continues using the external apparatus on a display in the case where it is determined that the external apparatus is not the predetermined external apparatus;
permitting the battery to be discharged but restricting the battery from being charged upon an instruction of continuously using the apparatus; and
inhibiting the battery from being discharged upon an instruction of not continuously using the apparatus.

11. The method according to claim 9, further comprising displaying information indicating that the apparatus stops communication with the external apparatus on a display in the case where it is determined that the external apparatus is not the predetermined external apparatus.

12. The method according to claim 9, further comprising displaying information indicating that the apparatus is uncommunicable with the external apparatus on a display unit in the case where it is determined that the external apparatus is not the predetermined external apparatus.

13. The method according to claim 9, further comprising:
displaying displays information indicating that the apparatus is uncommunicable with the battery and information for inquiring of a user about whether the user continues using the external apparatus on a display unit, in a case where it is determined that the battery is not the predetermined battery by performing the second authentication process;
permitting the battery to be discharged but restricting the battery from being charged upon an instruction of continuously using the apparatus; and
inhibiting the battery from being discharged upon an instruction of not continuously using the external apparatus.

14. A non-transitory storage medium that stores a program causing a computer to execute a method, the method comprising:
performing a first authentication process for determining whether an external apparatus connected to a connector is a predetermined external apparatus;
performing a second authentication process for determining whether a battery connected to the external apparatus is a predetermined battery; and
performing a control in accordance with a result of the first authentication process such that the battery is permitted to be discharged but is restricted from being charged regardless of whether the battery is the predetermined battery, in a case where it is determined that the external apparatus is not the predetermined external apparatus by the first authentication process.

* * * * *